Dec. 8, 1953 W. KOENIG, JR 2,662,123

ELECTRICAL TRANSMISSION SYSTEM, INCLUDING BILATERAL TRANSISTOR AMPLIFIER

Filed Feb. 24, 1951 3 Sheets-Sheet 1

INVENTOR
W. KOENIG, JR.
BY N. S. Ewing
ATTORNEY

INVENTOR
W. KOENIG, JR
BY N. A. Ewing
ATTORNEY

INVENTOR
W. KOENIG, JR.
BY N. S. Ewing
ATTORNEY

Patented Dec. 8, 1953

2,662,123

UNITED STATES PATENT OFFICE 2,662,123

ELECTRICAL TRANSMISSION SYSTEM INCLUDING BILATERAL TRANSISTOR AMPLIFIER

Walter Koenig, Jr., Clifton, N. J., assignor to Bell Telephone Laboratories, Incorporated, New York, N. Y., a corporation of New York Application February 24, 1951, Serial No. 212,639

3 Claims. (Cl. 179—170)

This invention relates, in general, to electrical translators; and more particularly, to electrical amplifier circuits including transistors.

It has been shown in application Serial No. 96,500, filed June 1, 1949, by R. M. Ryder, and issued concurrently herewith, that a four-pole transistor amplifier can be constructed to give power gain for signals passing through the circuit in both a forward and a reverse direction and that, under certain conditions, it can be made to give equal power gains in both directions of transmission. In each of the specific circuit arrangements disclosed by Ryder, a grounded collector transistor is connected between resistive terminations.

Such a circuit is adaptable for use as a two-way amplifier in many applications, including coaxial cable systems, but not in systems having reactive terminations such as loaded cable systems unless certain limiting conditions are observed.

It is the object of the present invention to provide a bilateral transistor amplifier having a wider range of utility than the circuits heretofore devised.

A more specific object of the present invention is to provide an amplifier circuit adapted to give bilateral gain between reactive terminations.

Another object of the invention is to provide a four-pole circuit in which the impedance looking into one pair of terminals is approximately the negative of the load impedance across the other pair of terminals.

In accordance with the present invention, it has been discovered that it is possible to obtain bilateral amplification in a grounded collector transistor circuit having reactive terminations, provided that, in addition to the conditions for non-reactive circuits taught by Ryder above, certain other relationships between the circuit parameters and load impedance obtain. These include, for example, the condition wherein the terminating impedances at the source and at the load are characterized by phase angles of the same sign. Moreover, it is shown hereinafter that the special conditions for optimum gain are realized when these phase angles are made equal and the collector resistance is made large compared to the other transistor parameters, and the resistive and reactive load components, but approximately half the value of the forward mutual transimpedance of the transistor.

In addition, the following useful relationship between the terminating impedance across each pair of terminals of the grounded collector circuit and the impedance looking into the pair of opposite terminals has been evolved in accordance with the present invention.

If the terminating impedance $Z_L$ between either pair of terminals approximates X per cent of the collector resistance $r_c$, then the negative impedance looking into the circuit from the opposite pair of terminals differs from $Z_L$ by approximately X per cent. This fact is made use of in certain of the disclosed embodiments which relate to signal repeating circuits of the negative resistance type, comprising a transistor in grounded-collector connection with one pair of terminals coupled in series with the line, and the other pair of terminals coupled to a balancing network.

The invention in its various ramifications, its objects, and features will be better understood from a study of the specification hereinafter with reference to the attached drawings, in which.

Figure 5:
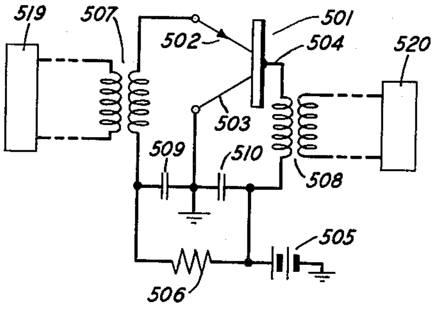
Fig. 5 shows a transmission system including a grounded-collector transistor bilateral amplifier having reactive terminations in accordance with the present invention, wherein the bias is locally supplied.
Figure 6:
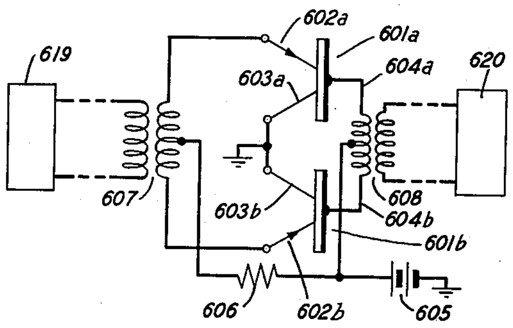
Fig. 6 shows a variation of the system of Fig. 5, a pair of grounded-collector transistor circuits in push-pull relation between reactive terminations with a local biasing arrangement.
Figure 7:
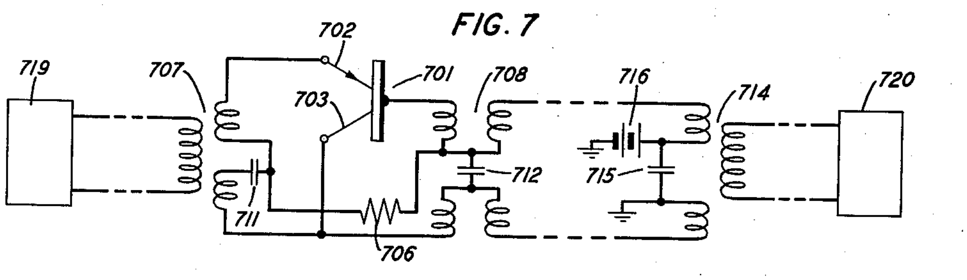
Fig. 7 shows a transmission system including a bilateral grounded-collector transistor circuit in accordance with the present invention in which bias is supplied over the line.
Figure 8:
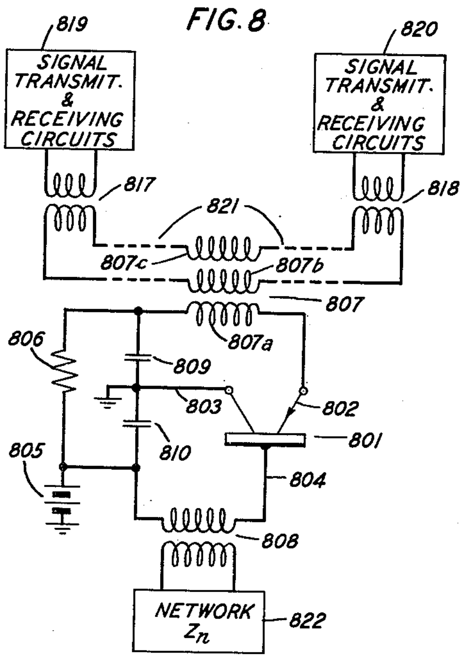
Fig. 8 shows a two-way electrical transmission system in which a transistor bilateral amplifier circuit having reactive terminations serves as a negative resistance repeater coupled in series with the line.
Figure 9:
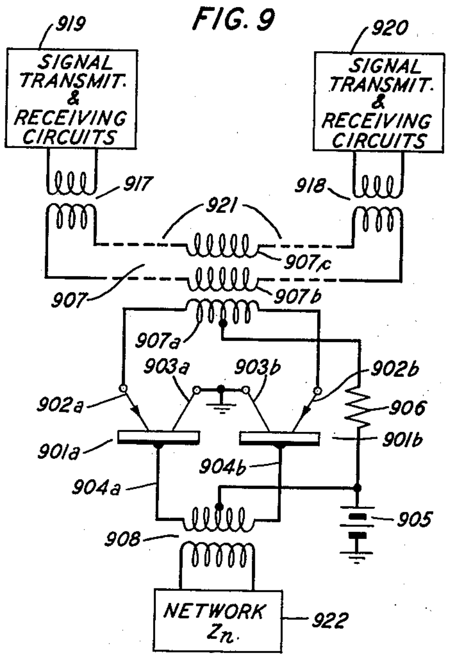
Fig. 9 shows a variation of the system of Fig. 5, in which a pair of grounded collector transistor circuits are connected in push-pull relation to serve as a negative resistance repeater coupled in series with the line.
Figure 10:
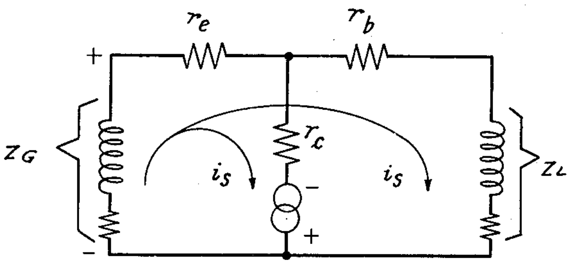
Figure 11:
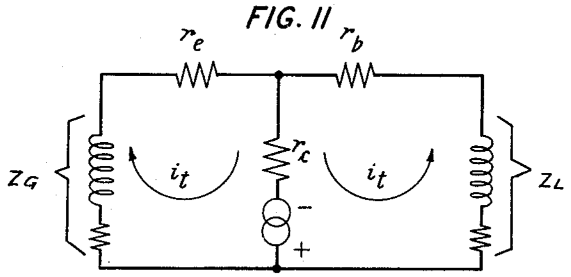
Figure 12:
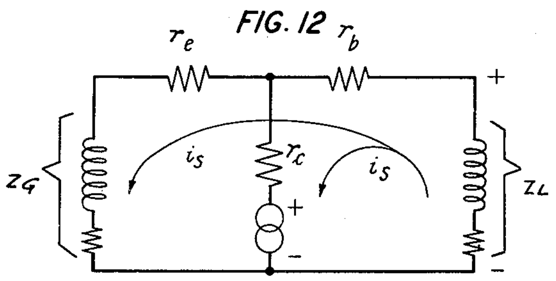
Figure 13:
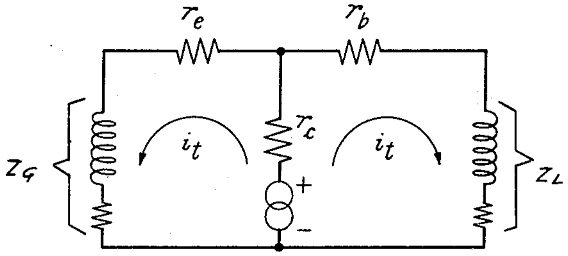

Figs. 10 and 11 are equivalent circuit diagrams showing the operation of the circuits of Figs. 5, 6, and 7; and Figs. 12 and 13 are equivalent circuit diagrams showing the operation of the circuits of Figs. 8 and 9.

Each of the circuits described in Figs. 5 through 9 includes as its active element an amplifying device which is known in the art as a "transistor," and the construction and operation of which is described in detail in Patent No. 2,525,035, issued October 3, 1950, to J. Bardeen and W. H. Brattain.

The body of the transistor comprises a block of germanium or similar material, the crystalline structure of which is believed to be altered by the presence of slight quantities of impurities, as described in Bardeen-Brattain above, to provide different conductive types, such as, for example, P-type and N-type. When the major portion of the block comprises material of one type, for example, N-type and the surface of it has been treated to produce a thin "barrier" layer of P-type, the block exhibits remarkable amplifying properties. Point contacts, respectively denoted the emitter and the collector, make rectifying contact with the treated surface of the germanium block. A third electrode makes low resistance contact with the body of the block.

In the specification hereinafter, it will be assumed that the body of each of the transistors disclosed comprises N-type germanium having a treated or barrier layer of P-type. However, it is apparent from a study of Bardeen-Brattain Patent 2,524,035 that transistors comprising a block having a body of "P-type" material with a barrier layer of N-type material will be equally suitable for substitution in the circuits described hereinafter. In the latter case, the polarity of the biases on the emitter and collector electrode will be reversed with respect to those indicated in the drawings and described hereinafter with reference thereto.

As a background for the discussion hereinafter, notations and conventions, as applied to transistor circuits, will be discussed briefly.

Figure 1:
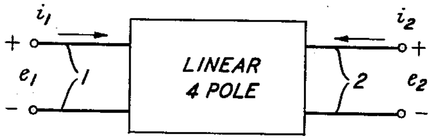
Figs. 1 through 4 are diagrams used in explaining the theory of the present invention.

Fig. 1 shows a four-terminal device which has two externally accessible meshes. It is convenient to describe such devices as four-poles, even though only two of the three possible external meshes are of interest.

Assuming that currents of the form $i_1\epsilon^{pt}$, $i_2\epsilon^{pt}$ are specified arbitrarily in the two external meshes, where $\epsilon^{pt}$ represents a sinusoidal function to time, then voltages $e_1\epsilon^{pt}$, $e_2\epsilon^{pt}$ appearing across the external terminal pairs are related to the currents by the following set of equations:

$$e_1 = Z_{11}i_1 + Z_{12}i_2 \qquad (1)$$
$$e_2 = \underline{Z}_{21}i_1 + \underline{Z}_{22}i_2 \qquad (2)$$

where the Z's are complex functions of $p$.

Equations 1 and 2 are valid under the assumption that the device is linear. The currents $i_1$ and $i_2$ are taken as the independent variables.

Equations 1 and 2 can be symbolized in matrix form as follows:

$$\begin{vmatrix} \underline{Z}_{11}\underline{Z}_{12} \\ \underline{Z}_{21}\underline{Z}_{22} \end{vmatrix} \qquad (3)$$

Placing $i_2=0$, and observing from Equations 1 and 2 the dependence of $e_1$ and $e_2$ on $i_1$, it is easy to interpret $\underline{Z}_{11}$ as the driving point or self-impedance of mesh 1 when mesh 2 is open and $\underline{Z}_{21}$ as the open-circuit transimpedance from mesh 1 to mesh 2 when mesh 2 is open. In a similar manner, when $i_1$ is placed equal to zero, it may be observed that $\underline{Z}_{22}$ is the self-impedance of mesh 2 when mesh 1 is open and $\underline{Z}_{12}$ the open-circuit transimpedance from mesh 2 to mesh 1.

Figure 2:
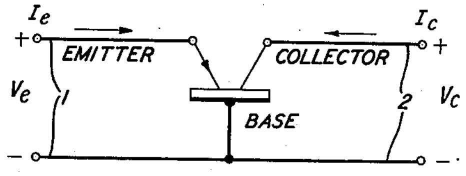

Referring to the conventionalized diagram of the transistor in Fig. 2, which shows an emitter electrode, a collector electrode, and a base electrode in contact with a semiconducting body, as described hereinbefore, the terminals 1 to the emitter and the base, and the terminals 2 to the collector and the base may be considered as corresponding to the respective terminals 1 and 2 of the generalized four-pole circuit of Fig. 1.

Assuming that $V_e$ represents the direct emitter potential, $I_e$ the direct emitter current, $V_c$ the direct collector potential, and $I_c$ the direct collector current, it has been found that any two of these may be chosen as independent variable and the remaining two expressed as functions thereof.

Adopting $I_e$, $I_c$ as independent variable, we have the relation $$V_e = V_c(I_e, I_c) \qquad (4)$$
$$V_c = V_e(I_e, I_c) \qquad (5)$$

Applying small increments $I_e$, $I_c$ to the direct-current values, one computes the first order increments in the voltages as follows:

$$v_e = \frac{\partial V_e}{\partial I_e}i_e + \frac{\partial V_e}{\partial I_c}i_c \qquad (6)$$

$$v_c = \frac{\partial V_c}{\partial I_e}i_e + \frac{\partial V_c}{\partial I_c}i_c \qquad (7)$$

From the above, placing $I_e = i_e\epsilon^{pt}$, $I_c = i_c\epsilon^{pt}$, $V_e = V_e\epsilon^{pt}$, and $V_c = V_c\epsilon^{pt}$, the equations take the same form as 1 and 2 above, where $$\underline{Z}_{11} = \frac{\partial V_e}{\partial I_e} \quad \underline{Z}_{12} = \frac{\partial V_e}{\partial I_c}$$
$$\underline{Z}_{21} = \frac{\partial V_c}{\partial I_e} \quad \underline{Z}_{22} = \frac{\partial V_c}{\partial I_c} \qquad (8)$$

It is thus apparent that by the choice of current as an independent variable, the open-circuit impedances $\underline{Z}_{ij}$ are arrived at as parameters for describing the linear behavior of the transistor four-pole.

Figure 3:
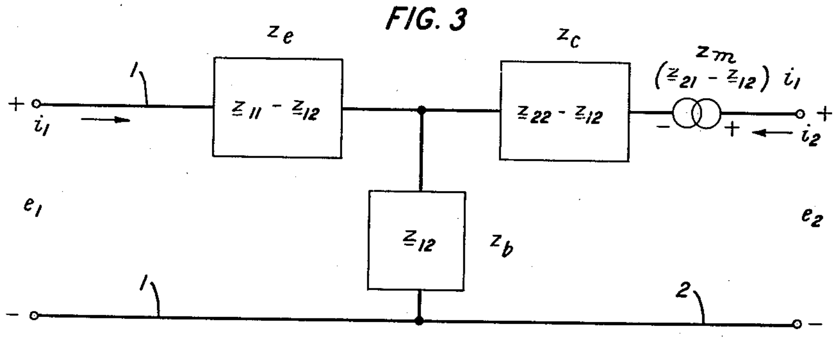

Fig. 3 represents the transistor network of Fig. 2 in the form of an equivalent T network, in which the emitter impedance is represented as $z_e$, the collector impedance as $z_c$, the base impedance as $z_b$, and the net mutual impedance as $z_m$. The active element of the transistor is represented as a voltage generator having polarity as shown, whose relationship to the emitter current is represented as $z_m i_1$, where $i_1$ is the small signal current into the emitter. As indicated from Fig. 2, the impedances of the equivalent transistor circuit can be defined in terms of the four-pole impedances developed above:

$$z_e = \underline{Z}_{11} - \underline{Z}_{12} \qquad (9)$$
$$z_c = \underline{Z}_{22} - \underline{Z}_{12} \qquad (10)$$
$$z_b = \underline{Z}_{12} \qquad (11)$$
$$z_m = \underline{Z}_{21} - \underline{Z}_{12} \qquad (12)$$

In the present discussion, the reactive components of the aforesaid impedances will be neglected, and the resistive components will be designated respectively as $r_e$, $r_c$, $r_b$, $r_m$.

For the purposes of this specification and the claims hereinafter, a current amplification factor of the transistor will be defined as the ratio $r_m/r_c = a$. It will be seen that this value is a close approximation to the transistor current amplification factor $\alpha$, defined as $$\frac{r_m + r_b}{r_c + r_b}$$

providing $r_b$ is small compared to $r_m$ and $r_c$. The basic transistor terminology thus defined will now be utilized in a brief theoretical discussion of the circuit of the present invention.

Figure 4:
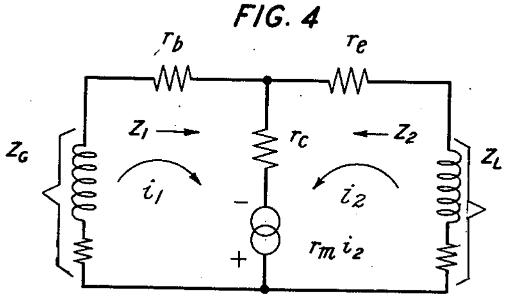

Consider the circuit indicated in Fig. 4 of the drawings, which is a schematic diagram of the signal paths in a transistor amplifier in accordance with the present invention. This comprises an N-type transistor of the type described hereinabove having a semiconducting body to which are attached an emitter electrode, a collector electrode, and a base electrode, which are respectively represented as resistances $r_e$, $r_c$, and $r_b$. On one side of the circuit, the reactive terminating impedance $Z_g$ is connected between the base electrode $r_b$ and a junction or ground point. On the other side of the circuit, the reactive terminating impedance $Z_L$ is connected between the emitter electrode $r_e$ and the junction or ground point. The collector electrode is connected to ground through a circuit of negligible impedance for signal currents.

Under the assumtion that a>unity, operation of the circuit shown in the equivalent diagram of Fig. 4 will be briefly analyzed.

Referring to Fig. 4, mesh equations may be set up as follows in accordance with the well-known principle of superposition, in order to solve for $V_G$, the potential drop around the left-hand loop, and $V_L$, the potential drop around the right-hand loop.

$$v_G=(Z_G+r_b+r_c)i_1+(r_c-r_m)i_2 \qquad (13)$$

$$v_L=r_ci_1+(r_c+r_e+Z_L-r_m)i_2 \qquad (14)$$

where $Z_G$ and $Z_L$ represent the impedances between the base and ground and emitter and ground respectively. Note that the symbolism now refers to the mesh of Fig. 4 instead of the open-circuit meshes of Figs. 1, 2, and 3.

From the above equations, the following determinant can be set up:

$$\Delta=(Z_G+r_b+r_c)(r_c+r_e+Z_L-r_m)-r_c(r_c-r_m) \qquad (15)$$

which simplifies to:

$$\Delta=r_c(r_e+Z_L)+(Z_G+r_b)(r_e+Z_L+r_c-r_m) \qquad (16)$$

In order for the system to be stable, $\Delta$ must be greater than zero. The condition for equal power gain in both directions is $r_m=2r_c$. If this is assumed, $\Delta$ reduces to:

$$\Delta=Z_GZ_L+Z_G(r_e-r_c)+Z_L(r_b+r_c)+r_c(r_e-r_b)+r_er_b \qquad (17)$$

The equations will be simplifier by making $r_e=r_b$. Then, $$\Delta=Z_GZ_L+Z_G(r_b-r_c)+Z_L(r_b+r_c)+r_b^2 \qquad (18)$$

Now, let $Z_G$ be represented by the complex quantity $g+jg'$, and $Z_L$ be represented by the complex quantity $l+jl^0$
Then, $$\Delta=[gl-g'l'+g(r_b-r_c)+l(r_c+r_b)+r_b^2]+j[gl'+g'l+g'(r_b-r_c)+l'(r_b+r_c)] \qquad (19)$$

Now, let $l'/g'=l/g=(r_c-r_b)/(r_c+r_b)$, which means that the two terminations have the same angle. Then $$\Delta=(gl-g'l'+r_b^2)+j(gl'+g'l) \qquad (20)$$

$$|\Delta|^2=(gl-g'l'+r_b^2)^2+(gl'+g'l)^2 \qquad (21)$$

The gain formula is derived as follows. The useful power in $Z_L$ is:

$$i_2^2l=V_G^2\frac{Z_{21}^2l}{\Delta^2}=V_G^2\frac{r_c^2l}{\Delta^2} \qquad (22)$$

The maximum available power from the source $Z_G$ is $$\frac{V_G^2}{4g} \qquad (23)$$

The power gain is the ratio of these two quantities, which is $$\frac{4glr_c^2}{\Delta^2} \qquad (24)$$

Only the resistive components of $Z_L$ and $Z_G$ are used in the numerator, but in the case of $\Delta$, the absolute magnitude is implied.

For illustrative purposes, let the angles of the two loads both be 45 degrees. Then, $g'=g$ and $l'=l$, and the gain becomes $$\frac{4glr_c^2}{4g^2l^2+r_b^4} \qquad (25)$$

This is a large gain if $r_c$ is large compared to $g$, $l$, and $r_b$.

In the equations for the circuit mesh shown in Fig. 4, which are developed in the foregoing paragraphs, the terminations are left general at first, and later specified in terms of resistance and reactance components. It is seen that there occurs a highly favorable cancellation of terms, both among the real and the imaginary components. Note that $r_e$ and $r_b$ are small and nearly alike in the average transistor, and can be made alike, as assumed in the derivation, by means of an external resistor. Similarly, $r_m$ is greater than $2r_c$ in the average transistor and can be made equal to $2r_c$ by building out $r_c$. The assumed relative magnitudes of the loads are favorable but not necessary. If $Z_G$ is arbitrarily made equal to $Z_L$, it will be found that $\Delta$ becomes larger, but still not so large as to preclude gains greater than unity. As $g'$ and $l'$ are made smaller than the assumed value, the first term of $\Delta$ becomes smaller and the second one larger. As they are made larger, the second term becomes smaller until the product $g'l'$ exceeds $r_b^2$ and then gradually becomes larger again.

If $r_b$ is assumed to be very much smaller, say, less than one per cent of the product $gl$, then it will be found that gain is obtained as long as this product is less than $r_c^2$. If, for example, the components $g$ and $l$ are each of the order of $r_c/3$, then a gain of roughly 9 decibels is obtained. If, by either reducing the components $l$ and $g$, or by increasing the size of $r_c$, the former each assume values as low as the order of $r_c/10$, gains of the order of 20 decibels are obtained.

Although the gain does not depend critically on the angles of the terminations, it is important that they be of the same sign, as $\Delta$ increases rapidly, reducing the gain to less than unity, when the signs are dissimilar. It will be apparent from a study of the foregoing equations that, assuming the signs are similar, the least favorable case for gain is that in which the phase angles of the terminations equal forty-five degrees.

Referring back to mesh Equations 13 and 14 relating to Fig. 4, $Z_1$, the impedance looking back into the terminals at $Z_G$, and $Z_2$, the impedance looking back into the terminals at $Z_L$ may be shown as follows:

$$Z_1=\frac{(r_b+r_c)(Z_L+r_e+r_c-r_m)-r_c(r_c-r_m)}{(Z_L+r_e+r_c-r_m)} \qquad (26)$$

and $$Z_2=\frac{(Z_G+r_b+r_c)(r_e+r_c-r_m)-r_c(r_c-r_m)}{(Z_G+r_b+r_c)} \qquad (27)$$

Let $r_m=2r_c$ and $r_e=r_b$; then $$Z_1=\frac{r_cZ_L+r_b(Z_L+r_b)}{Z_L+r_b-r_c} \qquad (28)$$

and $$Z_2=\frac{-r_cZ_G+r_b(Z_G+r_b)}{Z_G+r_b+r_c} \qquad (28)'$$

If $r_c$ is made very large relative to the other circuit parameters, then the following relationships become apparent:

$$Z_1\rightarrow\frac{Z_L}{-1}=-Z_L \qquad (29)$$

and $$Z_2\rightarrow-Z_G$$

In each case, the formulas derived in the preceding paragraphs for the impedances looking into each pair of terminals, with $Z_L$ and $Z_G$, respectively, connected to the opposite terminals, show that as $r_c$, the collector resistance, is made large in proportion to the other circuit parameters, the impedance looking into one terminal becomes approximately the negative of the termination at the other terminal. This condition is fulfilled as far as the transistor elements are concerned, since $r_c$, which is assumed to be built out of $r_m/2$, is of the order of 30,000 ohms, and $r_b$ and $r_e$ are assumed to be of the order of 300 ohms, a ratio of 100:1.

If specific values are substituted in Equations 28 and 28′, the following interesting relationships are found.

| $Z_L$ | $Z_1=k(-Z_L)$ | $Z_G$ | $Z_2=k'(-Z_G)$ | Assuming |
|---|---|---|---|---|
| 1% $r_c$ | $k=1.017$ | 1% $r_c$ | $k'=1.017$ | $r_c=30{,}000$. |
| 10% $r_c$ | $k=1.12$ | 10% $r_c$ | $k'=1.105$ | $r_e=300$. |
| 20% $r_c$ | $k=1.26$ | 20% $r_c$ | $k'=1.205$ | $r_b=300$. |
| | | | | $r_m=60{,}000$. |

From the above, it is apparent that the following relationship is approximately true. If the terminating impedance $Z_L$ between the emitter and collector terminals in the grounded collector circuit is equal to X per cent of $r_c$, then the impedance looking into the base and collector terminals differs by roughly X per cent from $-Z_L$. A similar relationship holds between $Z_G$, the terminating impedance between the base and collector terminals, and the impedance looking into the emitter and collector terminals.

The circuits shown in Figs. 5, 6, and 7 represent three specific examples of systems including transistor bilateral amplifiers constructed in accordance with the teachings of the present invention.

Fig. 5 shows an arrangement using a local source of battery supply for energizing current. This circuit includes a transistor 501 of the type shown and described in the Patent 2,524,035 of J. Bardeen and W. H. Brattain, which comprises a block of semiconductor material such as, for example, N-type germanium. In rectifying contact with this block is a point electrode 502 of, for example, phosphor bronze, which is designated the emitter; and a similar rectifying point contact electrode, the collector, 503 disposed at another point on the same surface of the block as the emitter. For the purposes of the present application, the electrode 503 is connected to the "ground" or low potential point of the circuit. A third electrode 504, is designated the base, which comprises a low resistance contact of rhodium or similar material plated onto another surface of the block. The transistor circuit is in tandem with, for example, a 19-gauge loaded transmission cable pair having a phase angle of forty-five degrees, on one side through a first coupling transformer 507, the secondary coil of which is connected between the emitter electrode and ground in series with signal by-pass condenser 509; and on the other side through another coupling transformer 508; the primary coil of which is connected between the base electrode 504 and ground in series with signal by-pass condenser 510. Each of these transformers may have, for example, a turns ratio of the order of 20,000:135, which is a convenient impedance ratio for the adjacent sections of the described cable, which may comprise part of a transmission system interconnecting terminal stations 519, and 520 which include conventional signal transmitting and receiving equipment. Biasing current is furnished by battery 505, which is of the order of forty volts, the negative terminal of which is connected to ground, or the collector electrode 503, and the positive terminal of which is connected to the base electrode 504 through one coil of transformer 508, and to the emitter 502 through the 2000 ohm bleeder resistance 506 and one coil of transformer 507. It is apparent that some of the current flowing through the collector 503 flows through the emitter 502, but most of it flows through the base 504, thus providing the proper biases to the transistor elements. In some cases, a retard coil is indicated in series with the bleeder resistance 506 to keep the signal currents out of the battery supply path. However this is not necessary if the resistance of the bleeder resistor 506 is sufficiently high.

The relationships between the loads $Z_L$ and $Z_G$ (which are respectively representative of the circuits at terminals 519 and 520, the transformers 507, 508 and the interconnecting cable sections) and the transistor parameters, are determined in accordance with the teachings in the earlier portions of the specification to give the desired gain, and to provide the desired impedances looking into the circuit terminations.

Fig. 6 of the drawings shows a circuit which is largely similar to the circuit shown in Fig. 5 except that it includes two transistors 601*a* and 601*b* in push-pull arrangement to provide a better balance. In the two circuits, elements having corresponding designations in the 500 and 600 series of designation numbers, respectively, may be assumed to be substantially similar. The emitters 602*a* and 602*b* are connected to the two terminals of the secondary coil of transformer 607; and the base electrodes 604*a* and 604*b* are connected to the terminals of the primary coil of transformer 608, whose center tap is connected to the positive tap of biasing battery 605. The collectors 603*a* and 603*b* are connected together to ground. The transformers 607 and 608 are connected through respective cable sections on either side, which are of the type described with reference to Fig. 5, to terminal stations 619 and 620. Here, as with reference to the circuit of Fig. 5, the teachings in the earlier part of the specification apply to the selection of the load impedances, and their relation to the transistor parameters.

Fig. 7 shows a circuit in which energizing power for the bilateral transistor amplifier circuit is supplied over the line.

As in previous embodiments, the relations between the parameters of transistor 701 and the load impedances are determined in accordance with the teachings set forth in the earlier part of the specification.

On one side of the circuit of Fig. 7, the impedance $Z_L$ includes the transformer 707, comprising a pair of windings connected in series between the emitter and collector, both inductively coupled to a third winding, which is connected through a transmission circuit of the type described with reference to Fig. 5, to conventional signal transmitting and receiving circuits at terminal 719. On the other side, the impedance $Z_G$ includes the transformer 708, comprising two pairs of inductively coupled coils, one pair of which is connected in series between the base and collector of transistor 701; and the second pair of which is connected through a line section to a similar pair of series connected coils of transformer 714. A third coil of transformer 714 inductively coupled to the last-mentioned pair is connected through a line section to the conventional signaling circuit at terminal 720.

The transistor 701 is coupled with the line through transformer 707, connected between the emitter and collector electrodes on one side, and transformer 708 connected between the base and collector electrodes on the other side. Biasing current for the transistor electrode is furnished through a repeat-coil arrangement at the terminal station, which comprises potential source 716, of the order of forty volts, the positive terminal of which is connected through a portion of the windings of each of repeat coils 714 and 708, and across the direct-current connection between the primary and secondary coils of transformer 708 to the base electrode of transistor 701; and also from the said direct-current connection through the 2000 ohm bleeder resistance 706 connected to the center tap of coil 708, and a portion of the windings of coil 707 to the emitter electrode 702. The signal by-pass condensers 711, 712, and 715 are respectively placed in series with a portion of the windings in each of the transformers 707, 708, and 714 to provide signal by-pass paths around the high resistance energizing circuit. The collector 703 is connected to the low potential junction of one of the coils of each of transformers 707 and 708.

Such applications as described in Figs. 5, 6, and 7 are adaptable for use in repeaters of the "21" type in which the transistor bilateral amplifier circuit, such as indicated in Fig. 7 including transistor 701, is connected in tandem with the transmission line which terminates in the signal transmitting and receiving stations 719 and 720 at its two ends. In this case, no balancing networks are needed, but the impedances should be similar in the two directions, and message signaling currents by-passed, as shown.

The circuit of the present invention is also adaptable for use as a negative resistance repeater in which case signaling current need not be by-passed, and the terminating impedances can be dissimilar, but an auxiliary impedance network is needed.

Such a repeater circuit utilizing a transistor as a negative resistance element is shown in Figs. 8 and 9 of the drawings. Referring in detail to Fig. 8, transistor 801 is of a type such as described hereinbefore, having an emitter 802, a base 804, and a collector 803 connected to ground as in the previously described circuits. This circuit is coupled to the reactive transmission line 821, through one of the coils 807a of the three-winding transformer 807. The transmission line 821, which may, for example, be a 19 gauge loaded cable pair, with a phase angle of forty-five degrees, as described before, connects the signal transmitting and receiving circuits at terminal 819 with the transmitting and receiving circuits at terminal 820. The coil 807a is connected between the emitter 802 and ground in series with the condenser 809, which may, for example, have a value of the order of four microfarads. The base electrode 804 is connected through the primary coil of the transformer 808 to the collector 803 in series with the four-microfarad by-pass condenser 810. The balancing network 822, which is coupled to the base circuit through the transformer 808, is so constructed that it has a positive impedance such as to yield the desired negative impedance when viewed from the line. The negative impedance Z, which is to be inserted in the line, depends on the characteristic of the repeater circuit. For example, if the latter is such that the input impedance looking into the emitter and collector terminals is equal to the negative of the terminating impedance connected across the collector and base terminals, then $Z_n$, the characteristic impedance of balancing network 822, should be made equal to the impedance presented across the emitter and collector electrodes by the line. The balancing network 822 may be constructed in accordance with the teachings of J. L. Merrill, Jr., Patent 2,582,498.

As in the previous circuits, bias of approximately forty volts is supplied from the battery 805, the positive terminal of which is connected through the primary coil of transformer 808 to the base electrode 804, and through a bleeder resistance 806, of the order of 2000 ohms, and coil 807a of the three-way transformer 807 to the emitter electrode 802. A variation of this circuit may be made by reversing the connections to the base and emitter electrodes.

A similar and better balanced circuit is shown in Fig. 9 of the drawings, in which the single transistor indicated in Fig. 8 is replaced by a pair of transistors 901a and 901b in push-pull arrangement.

In this circuit, the emitters of the respective transistors 901a and 901b are connected to the two terminals of coil 907a which is part of the three-winding transformer 907 providing coupling to the line, as in the previously described arrangement. The two collector electrodes are connected together to ground; and the base electrodes are connected to opposite terminals of the primary coil of transformer 908, which performs the function of coupling to a balancing network, as in the previously described arrangement. Bias is furnished from the positive terminal of battery 905, which is connected through resistance 906, of the order of 2000 ohms, to the center tap of transformer coil 907a for the emitter electrodes, and directly to the center tap of one coil of transformer 908 for the base electrodes.

Since it is comparatively simple to provide battery supply for the transistor from a remote point, the 21-type application is adapted for use as an unattended repeater.

The equivalent circuit diagrams shown in Figs. 10 to 13, inclusive, supplement the circuit schematics of Figs. 5 to 9, inclusive; and illustrate the following explanation of the method of operation of the disclosed repeaters.

Fig. 10 is an equivalent diagram of Fig. 5 in which the terminal stations, the two lines and the transformers are now represented simply by the terminations $Z_G$ and $Z_L$. Suppose a signal is coming from the left, that is, it originates in $Z_G$ with the polarity indicated. If the transistor is regarded simply as a passive network, currents labeled $i_s$ will flow in the two meshes in the directions indicated. The presence of a current in the emitter circuit of the transistor, however, causes a voltage to be generated in the collector circuit of the transistor. This voltage has the indicated polarity and produces currents labeled $i_t$ flowing as shown in Fig. 11. It will be noted that $i_t$ is in the same direction as $i_s$ in $Z_G$, but is in the opposite direction in $Z_L$. The current in $Z_L$, however, due to the transistor, is so much greater than it would have been if the transistor were not present, that there is effective amplification of the signal from $Z_G$ into $Z_L$, as shown mathematically, in Equations 13 through 25.

A signal coming from the opposite direction is indicated in Fig. 12. The resultant current in the emitter circuit again produces a voltage in the collector circuit, this time with the opposite polarity. The resulting currents due to the transistor are shown in Fig. 13. Again there is amplification as proved mathematically in the earlier part of the specification.

It will be obvious that these diagrams, although they bear directly on Fig. 5, also apply equally well to Figs. 6, 7, 8, and 9. With regard to Fig. 8, the network 822 may be represented by the termination $Z_L$ in Fig. 10, and external circuits, viz. the line in Fig. 8, by $Z_G$ in Fig. 10. As noted before, $i_t$ in $Z_G$ is in the same direction as $i_s$ in $Z_G$; that is, more current is flowing in $Z_G$ than would be flowing if the transistor were not there. This means that the transistor inserted ahead of $Z_L$ acts like a negative resistance because it decreases the effective total resistance of the combination of $Z_G$ and $Z_L$, as was more rigorously proved mathematically in Equations 26 through 30.

A similar argument can be used in case the transistor is reversed, that is, if $Z_L$ represents the impedance presented to the transistor by the line as in Fig. 8. In this case Figs. 12 and 13 apply, and it will be seen that $i_t$ is in the opposite direction from $i_s$. A voltage in $Z_L$ therefore causes a current to flow in the opposite direction from that in which it would flow if the transistor were not present. This is another way of saying that the transistor inserted between $Z_L$ and $Z_G$ acts as a negative resistance.

Bilateral amplification between reactive loads can be carried out in accordance with the teachings of the present invention in different types of systems, and using other circuit arrangements than those described herein by way of illustration.

What is claimed is:

1. A bilateral amplifier for transmitting signals with substantial power gains in a forward direction and in a reverse direction, said amplifier including a semiconductor body having in contact therewith an emitter electrode, a collector electrode, and a base electrode, a first load circuit including said base electrode and said collector electrode, said first load circuit having a reactive impedance $Z_G$, a second load circuit including said emitter electrode and said collector electrode, said second load circuit having a reactive impedance $Z_L$, said first and second load circuits having a common portion including said collector electrode, wherein the current amplification factor $a$ is greater than unity, wherein the quantity $$r_c(r_e+Z_L)+(Z_G+r_b)(r_e+Z_L+r_c-r_m)$$

is greater that zero, wherein the phase angles of the impedances $Z_L$ and $Z_G$ are of the same sign, wherein the product of the real components of impedances $Z_L$ and $Z_G$ is substantially less than $r_c^2$, and wherein $r_b$, $r_c$ and $r_e$, respectively, represent the base resistance, the collector resistance, and the emitter resistance of said transistor, and $r_m$ represents the resistive component of the collector transimpedance.

2. A combination comprising an electrical transmission line having a substantial reactive component, negative resistance repeating means coupled to said line, said negative resistance repeating means comprising in combination a transistor having an emitter electrode, a base electrode, a collector electrode and a semiconducting body in contact with said electrodes, a first coupling means connected in series with signal by-passing means between one of said first two electrodes and said collector electrode for coupling said transistor to said line, a second coupling means connected in series with signal by-passing means between the other of said first two electrodes and said collector electrode, a balancing impedance network coupled to said transistor through said second coupling means, and means in circuit relation with the electrodes of said transistor for biasing said electrodes to operating condition, wherein the impedance looking into said transistor from said first coupling means is substantially equal to a negative unit constant times the impedance of said balancing network.

3. A two-way electrical transmission channel including interposed in said channel at least one two-way semiconductor amplifier, said amplifier comprising a semiconducting body, an emitter electrode, a collector electrode, and a base electrode in contact with said body, a first load circuit connected between said base and collector electrodes and having an impedance that includes a substantial reactive component, and a second load circuit connected between said emitter and collector electrodes having an impedance that includes a substantial reactive component, wherein at least one of said load circuits comprises said two-way electrical transmission channel, wherein the impedance looking into said transistor from one of said load circuits is substantially equal to a negative unit constant times the impedance of the other of said load circuits, wherein $r_m$ approximates $2r_c$, $r_e$ approximates $r_b$, and $Z_G$ is of the same order of magnitude as $Z_L$, which is not substantially in excess of one per cent of the numerical value of the collector impedance $r_c$, wherein $Z_L$ and $Z_G$ respectively represent the impedances of said first and second load circuits, wherein $r_b$ and $r_e$ respectively represent the base and emitter resistances, and wherein $r_m$ represents the resistive component of the net mutual transimpedance of said transistor.

WALTER KOENIG, JR.

References Cited in the file of this patent

UNITED STATES PATENTS

| Number | Name | Date |
|---|---|---|
| 2,517,960 | Barney et al. | Aug. 8, 1950 |
| 2,522,395 | Ohl | Sept. 12, 1950 |
| 2,550,518 | Barney | Apr. 24, 1951 |
| 2,585,078 | Barney | Feb. 12, 1952 |